United States Patent [19]

Weckenbrock

[11] Patent Number: 4,617,589
[45] Date of Patent: Oct. 14, 1986

[54] ADAPTIVE FRAME COMB FILTER SYSTEM

[75] Inventor: Hermann J. Weckenbrock, Bordentown, N.J.

[73] Assignee: RCA Corporation, Princeton, N.J.

[21] Appl. No.: 682,765

[22] Filed: Dec. 17, 1984

[51] Int. Cl.[4] .............................................. H04N 9/64
[52] U.S. Cl. ........................................ 358/31; 358/36
[58] Field of Search ................... 358/31, 36, 37, 166, 358/167; 358/105, 329

[56] References Cited

U.S. PATENT DOCUMENTS

| 4,241,363 | 12/1980 | Maeyama et al. | 358/36 |
| 4,296,436 | 10/1981 | Achiha | 358/167 |
| 4,498,099 | 2/1985 | Pritchard | 358/31 |
| 4,498,100 | 2/1985 | Bunting et al. | 358/31 |
| 4,550,340 | 10/1985 | Nicholson et al. | 358/31 |
| 4,553,158 | 11/1985 | Acampora | 358/31 |
| 4,555,723 | 11/1985 | Pritchard | 358/31 |

FOREIGN PATENT DOCUMENTS

| 3007520 | 9/1981 | Fed. Rep. of Germany . | |
| 0077782 | 5/1984 | Japan | 358/31 |
| 2035745 | 6/1980 | United Kingdom . | |

OTHER PUBLICATIONS

Ser. No. 444,381, filed 11-26-82, by D. H. Pritchard, entitled "Apparatus for Frame-to-Frame Comb Filtering Composite TV Signal" U.S. Pat. No. 4,498,099.
Ser. No. 577,507, filed 2-6-84 by Reitmeier et al, entitled "Circuitry for Correcting Frame Combed Luminance Signal for Motion Induced Distortion.

Primary Examiner—James J. Groody
Assistant Examiner—Michael P. Dunnam
Attorney, Agent, or Firm—E. M. Whitacre; P. J. Rasmussen; E. P. Herrmann

[57] ABSTRACT

A frame comb filter system having circuitry to minimize motion-induced artifacts in the reproduced image includes a line comb filter to extract a relatively high frequency luminance correction signal from frame comb filtered chrominance signal. This luminance correction signal, however, includes undesirable signal components due to vertical chrominance transitions even in the absence of motion. The system therefore includes circuitry to selectively recombine the high frequency luminance correction signal with frame comb filtered luminance signal only when motion occurs.

11 Claims, 2 Drawing Figures

ADAPTIVE FRAME COMB FILTER SYSTEM

This invention relates to apparatus for reducing motion-induced artifacts in frame comb filtered video signals.

BACKGROUND OF THE INVENTION

It is known that a composite video signal may be advantageously separated into its luminance and chrominance components with frame comb filters. Video signal component separation using frame comb filters is possible because of the inherent high level of signal redundancy or correlation between successive image frames. However, when a scene is "panned" or features within an image move between frames, the interframe correlation is reduced. The effect of image motion on the frame comb filter system is the incomplete video signal component separation with concomitant artifacts in reproduced images. The artifacts are manifested as dual images in the areas of image feature motion and incorrect hue along the edges of moving objects, etc.

Pritchard in U.S. patent application Ser. No. 444,381, filed Nov. 26, 1982 (now U.S. Pat. No. 4,498,099) and entitled "Apparatus For Frame-To-Frame Comb Filtering Composite TV Signal" describes apparatus for partially correcting motion-induced artifacts in a frame comb filter system. The apparatus Pritchard disclosed in the reference includes a low-pass filter coupled to the frame comb filter chrominance component output to extract signal components below the range of signal frequencies occupied by the chrominance signal. The extracted or correction signal is added to the frame comb filtered luminance signal with the effect of substantially eliminating motion-induced dual images. The apparatus disclosed in the Pritchard reference also includes circuitry for detecting the occurrence of interframe motion. When motion is detected, frame comb filtered luminance signal is selectively added to the frame comb filtered chrominance signal with the effect of substantially correcting motion-induced hue errors at the edges of moving objects.

Reitmeier et al. in U.S. patent application Ser. No. 577,507, filed Feb. 6, 1984 and entitled "Circuitry For Correcting Frame Combed Luminance Signal For Motion Induced Distortion" improved upon the Pritchard apparatus. Reitmeier et al. coupled an interline comb filter to the frame comb chrominance output to extract the high frequency luminance spectral components from the combed chrominance signal. These high frequency luminance spectral components along with low-passed filtered frame comb filtered chrominance signal are added to the frame comb filtered luminance signal to more completely eliminate motion-induced errors in the frame comb filtered luminance signal.

Nominally when there is no interframe image motion there is no correction signal to be extracted from the frame comb filtered chrominance signal and added to the luminance signal. That is, the correction signals are zero valued. In light of this, the signal extracting apparatus of Pritchard and Reitmeier et al. is permanently coupled to the circuitry which adds the correction signals to the luminance component.

However, an interline comb filter used to extract the higher frequency correction signal can produce undesirable signal components when line-to-line chrominance differences exist in the absence of interframe motion. These signal components introduce "hanging dots" in the reproduced image.

Reitmeier et al. also disclose apparatus for producing a corrected frame comb filtered chrominance signal. This apparatus, which is coupled at the frame comb chrominance output, includes the cascade connection of an interline comb filter and a filter which attenuates signal outside the range of frequencies occupied by the chrominance component, thereby eliminating out-of-band motion-induced signal contaminants in the comb filtered chrominance signal. However, the insertion of the interline comb filter in the chrominance channel has the undesirable effect of reducing vertical resolution.

SUMMARY OF THE INVENTION

The present invention is an adaptive frame comb filter including means for extracting low frequency motion-induced contaminants and high frequency motion-induced contaminants from the comb filtered chrominance component signal. The extracted contaminants are applied to adder circuitry which is serially connected to the frame comb filter luminance output. The adder combines the contaminants with the frame comb filtered luminance signal to correct motion-induced double images. A detector circuit for detecting interframe motion selectively applies at least the high frequency contaminants to the adder only when interframe motion occurs.

DETAILED DESCRIPTION

In the figures, elements labeled with like designation numbers are similar or equivalent elements. The apparatus is described in the context of a digital signal processing system but may be practiced on analog signals with appropriate change to analogous analog signal processing elements.

In the following discussion, the system is operated to separate chrominance and luminance component signals from composite video. However, it will be appreciated that the system may be applied to e.g. luminance signal in a camera system, to clean out frequency bands in the luminance signal for the insertion of chrominance signal in the formation of a composite signal.

Figure 1:
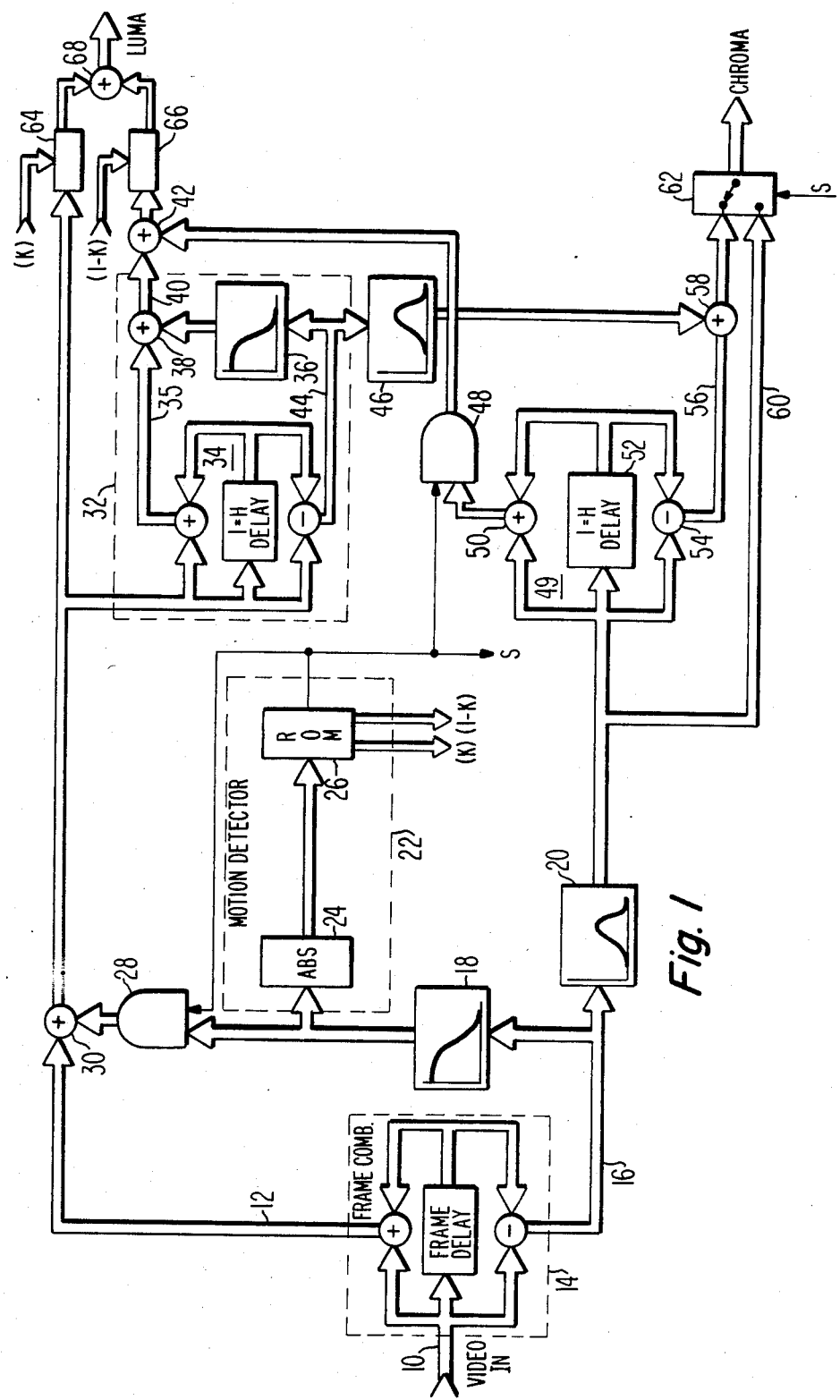
FIG. 1 is a block diagram of an adaptive frame comb filter system embodying the present invention.

Referring to FIG. 1, element 14 is a frame comb filter (in this case for NTSC video signals). The remaining circuit elements of the system are included to reduce motion-induced artifacts in the frame comb filtered luminance and chrominance signals created by the comb filter processing. Composite video input samples are applied to input port 10. Frame comb filtered luminance signal samples are produced from the frame comb filter 14 on output bus 12 and frame comb filtered chrominance signal samples are produced on output bus 16. For still pictures, luminance and chrominance separation is substantially perfect. In the presence of image motion, however, uncancelled luminance signal occurs in the filtered chrominance signal and uncanceled chrominance occurs in the filtered luminance signal.

A low-pass filter 18 coupled to the chrominance output bus 16 extracts the uncanceled luminance signal in the frequency range below the range of frequencies normally occupied by the chrominance signal. The output of low-pass filter 18 is coupled via AND gate 28 to one input port of adder 30. The other input port of adder 30 is coupled to the luminance output 12 of the frame comb filter 14. The output of low-pass filter 18 is also coupled to the input port of a motion detector 22 which generates a control signal S when the amplitude of the extracted signal exceeds a predetermined level, indicating that image motion has occurred between successive image frames. Control signal S is applied to AND gate 28 and conditions it to pass signal from filter 18 to adder 30 wherein it is added to the frame comb filtered luminance signal to correct lower frequency motion-induced artifacts. In the absence of control signal S, AND gate 28 applies a zero value to adder 30.

The control signal S is generated when the extracted signal exceeds a predetermined level in order to provide a degree of noise immunity. Low amplitude, lower frequency correction signals are not coupled back into the frame comb filtered luminance signal. In effect, the combination of detector 22 and AND gate 28 tends to core the lower frequency correction signal. The predetermined threshold level is determined subjectively to give the most favorable results.

Corrected luminance signal from adder 30 is coupled to a variable attenuator 64 controlled by signal K from the motion detector 22. In the absence of motion, the value of signal K is one and variable attenuator 64 passes the luminance signal from adder 30 to one input port of adder 68. The value of control signal, K, decreases from the value one with increasing motion detected by motion detector 22. As the value of K decreases, the variable attenuator proportions the luminance signal from adder 30 by the factor K.

Luminance signal from adder 30 is also coupled to an interline comb filter 32. Interline comb filter 32 includes a basic line comb filter 34 which produces a line comb filtered luminance signal on output bus 35 and signal within the spectral bands normally occupied by line comb filtered chrominance signal on output bus 44. Signal from bus 44 is coupled to a low-pass filter 36 which extracts vertical detail. The vertical detail from low-pass filter 36 is applied to adder 38 wherein it is added back into line comb filtered luminance signal to produce a luminance output signal at port 40.

The line comb filtered luminance signal on port 40 is coupled to a second variable attenuator 66 which is controlled by a signal (1-K) developed by motion detector 22. Variable attenuator 66 proportions the line comb filtered luminance signal by the factor (1-K) which varies from zero for no motion to one for a large degree of motion.

Signal from variable attenuator 66 is coupled to a second input port of adder 68. The output signal (LUMA) from adder 68 is the sum of K times the signal from adder 30 plus (1-K) times the line comb filtered signal. Assuming that the output of the line comb 32 is normalized, the amplitude of the output signal from adder 68 will in general be equal the amplitude of the luminance signal from the frame comb filter 14.

In the presence of motion, the luminance signal from the frame comb filter 14 contains a degree of uncanceled chrominance signal. Line comb filters, on the other hand, are unaffected by interframe image motion. Thus, the luminance output from line comb filter 32 will be free of motion-induced chrominance components. Therefore, when motion occurs, the luminance signal from adder 68 is derived primarily from the line comb 32.

Line comb filters tend to reduce both vertical and diagonal resolution. Therefore, in the absence of motion, the luminance signal from adder 68 is primarily derived directly from adder 30.

The frame comb filtered chrominance signal from output bus 16 is coupled to a band-pass filter 20 which attenuates signals having frequencies outside the band of frequencies normally occupied by the chrominance signal. Band-pass filter 20 substantially eliminates the lower frequency luminance contaminants produced in the frame comb filtered chrominance signal due to interframe motion. Band-pass filtered chrominance signal is coupled to a conventional interline comb filter, 49, consisting of 1-H delay line 52, adder 50 and subtracter 54. Adder 50 produces output signals occurring in the frequency bands normally occupied by luminance signal components. As such, the output signal from adder 50 consists of motion-induced luminance contaminants occurring in the range of frequencies occupied by chrominance signal. This signal corresponds to a higher frequency luminance correction signal. The output of adder 50 is coupled to one input port of adder 42 via AND gate 48. Adder 42 adds the higher frequency luminance correction signal to the line comb filtered luminance signal from line comb filter 32.

Interline comb filters tend to introduce a chrominance component in the line comb luminance output when intraframe, line-to-line chrominance changes occur, even in the absence of motion. This chrominance component in the line comb filtered luminance output signal produces "hanging dots" in the reproduced image. Therefore, the higher frequency luminance correction signal should not be coupled to the frame comb filtered luminance signal in the absence of motion. To effect such selective addition of the higher frequency luminance correction signal, an AND gate 48, which is controlled by control signal S, couples the higher frequency luminance signal to adder 42 only during interframe motion signals.

The uncanceled luminance signal in the frame comb filtered chrominance signal, produced during interframe image motion, corresponds to a frame comb filtered luminance correction signal. Similarly uncanceled chrominance in frame comb filtered luminance signal corresponds to a chrominance correction signal. This chrominance correction signal is available from the line comb filter 32 chrominance output port 44. A band-pass filter 46 is coupled to output port 44 to separate the chrominance correction signal from the luminance vertical detail signal. The output of band-pass filter 46 is coupled to one input of adder 58. The other input of adder 58 is coupled to the chrominance output 56 of the interline comb filter 49 from which line comb filtered, frame comb filtered chrominance signal is available. The output of adder 58 is coupled to one signal input port of switch 62. Band-pass filtered chrominance signal from band-pass filter 20 is coupled to a second signal input port of switch 62. Switch 62 is conditioned by control signal S to provide a chrominance output signal (CHROMA) from adder 58 during interframe motion periods and from band-pass filter 20 during the absence of interframe motion.

The interline comb filter, 49, is inserted in the chrominance signal path during motion periods to eliminate the higher frequency components of the luminance contaminants. However, since interline comb filters tend to reduce vertical resolution, comb filter 49 is effectively bypassed by switch 62 in the absence of motion.

Motion detector 22 includes a magnitude detector 24 which develops the absolute value of the samples output from the low-pass filter 18. The magnitudes from detector 24 are applied as address codes to a look-up table ROM 26. ROM 26 is programmed to produce appropriate values K and 1-K for respective magnitudes applied as address codewords. In addition, ROM 26 produces the control signal S for address codewords greater than a predetermined value. As shown, the motion detector 22 operates as a variable threshold detector.

Several comments are in order regarding the illustrated embodiment of FIG. 1. First, compensating delays may be required in certain of the signal paths to insure temporal alignment of samples at various circuit elements. One skilled in the art of circuit design will readily be aware of these requirements and know to insert such delays. Second, depending on the particular application in which the adaptive frame comb system is used, the variable attenuators 64 and 66 and adder 68 may be replaced with a switch such as switch 62. Alternatively, switch 62 may be replaced by two variable attenuators and an adder. Finally, comb filters nominally introduce a gain of two. Thus, the comb filtered output signals may be divided by two or the signals which are summed and differenced within the comb filters may be scaled by ½ in order to normalize the comb filtered output signals.

Figure 2:
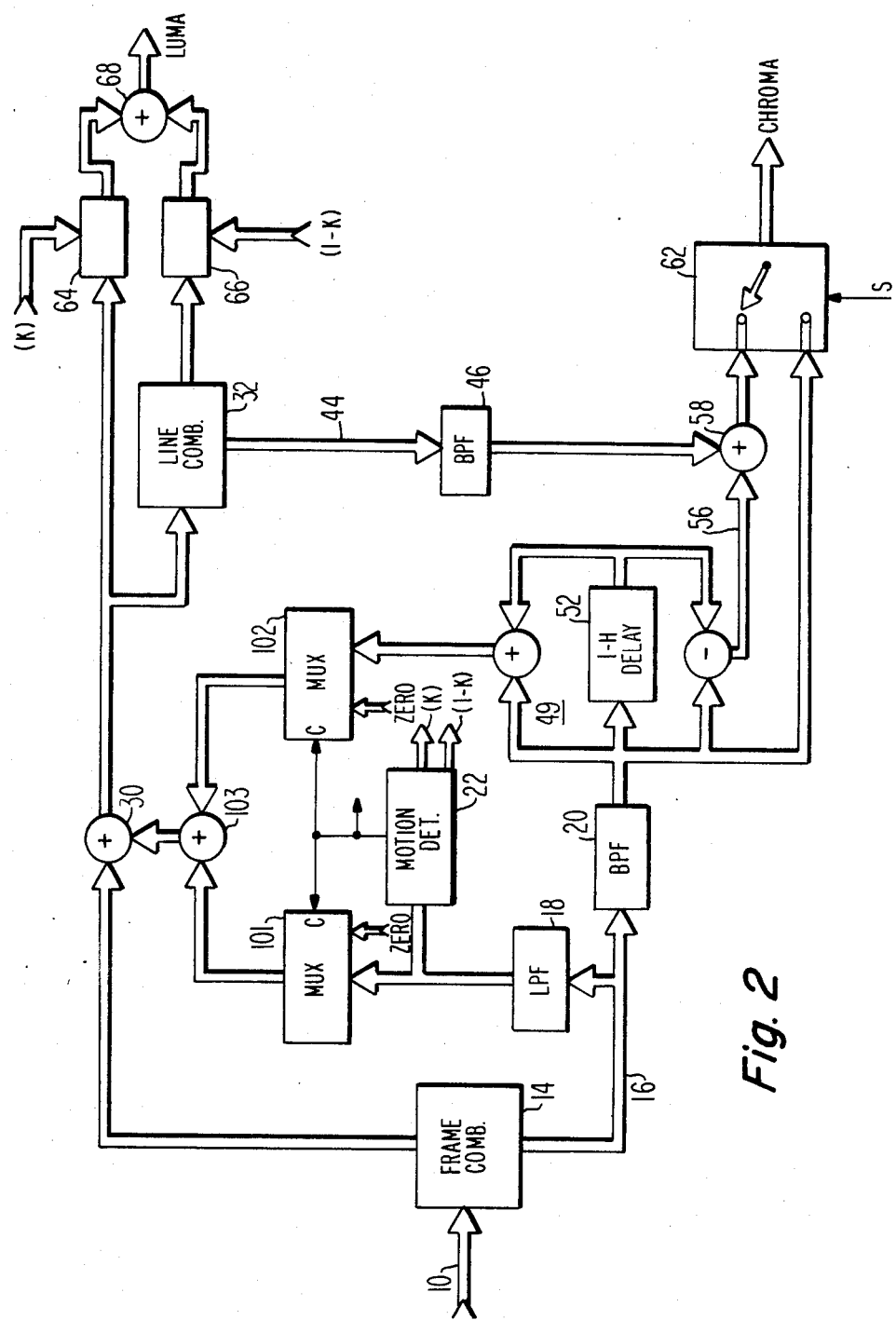
FIG. 2 is a block diagram of an alternative adaptive frame comb filter system embodying the present invention.

The FIG. 2 embodiment is similar to that of FIG. 1 with the exception that the higher and lower frequency luminance correction signals extracted from the frame comb filtered chrominance signal are first combined before reinsertion in the frame comb filtered luminance signal. In FIG. 2, lower frequency luminance correction signal from the low-pass filter 18 is applied to one signal input port of multiplexer 101. The second signal input port of multiplexer 101 is coupled to a zero reference value. The output port of multiplexer 101 is coupled to one input port of adder 103 and is conditioned by control signal S to pass samples from low-pass filter 18 to adder 103 in the presence of motion and the zero value otherwise.

The higher frequency luminance correction signal from the interline comb filter 49 is coupled to a first signal input port of multiplexer 102 and a zero reference value is applied to a second signal input port thereof. The output of multiplexer 102 is coupled to a second input port of adder 103. Multiplexer 102 is conditioned by control signal S to pass samples from interline comb filter 49 to adder 103 during interframe motion periods and zero reference value otherwise.

Adder 103 combines the higher and lower frequency luminance correction signals and the combined correction signals are coupled to adder 30. Adder 30 inserts the combined luminance correction signals into the frame comb filtered luminance signal to eliminate motion-induced luminance errors.

What is claimed is:

1. An adaptive frame comb filter system for comb filtering video signals, comprising:
    a source of video signals;
    a frame comb filter coupled to said source for generating at a first output port, a first output signal corresponding to the sum of non-delayed and frame delayed signals, and generating at a second output port a second output signal corresponding to the difference of non-delayed and frame delayed signals;
    means coupled to the second output port for extracting relatively low frequency interframe motion-induced signals and relatively high frequency interframe motion-induced signals;
    means responsive to said relatively low frequency interframe motion-induced signals for generating a control signal on the occurrence of such signals;
    means including means for combining said relatively low frequency and relatively high frequency interframe motion-induced signals with said first output signal to produce a substantially motion-corrected first output signal and including means responsive to said control signal for selectively coupling at least said relatively high frequency interframe motion-induced signals to said combining means only when said relatively low frequency motion-induced signals occur.

2. The comb filter system set forth in claim 1 wherein said means for extracting said relatively high frequency motion-induced signals includes an interline comb filter having an input coupled to said second output port, and having a first output from which sums of non-delayed and line delayed signals are available, which sums correspond to said relatively high frequency motion-induced signals.

3. The comb filter system set forth in claim 2 wherein said interline comb filter further includes a second output from which differences of non-delayed and line delayed signals are available, and wherein said comb filter system further includes:
    an output terminal; and
    means responsive to said control signal for selectively coupling said interline comb filter second output to said output terminal when said relatively low frequency motion-induced signals occur and coupling said frame comb filter second output port to said output terminal otherwise.

4. The comb filter system set forth in claim 3 wherein said means including means for combining further includes:
    a further interline comb filter having an input port coupled to said combining means for applying said substantially motion-corrected first output signal, said further interline comb filter having an output port from which differences of non-delayed and line delayed signals are available;
    signal combining means having a first input port coupled to said interline comb filter second output, having a second input port and having an output port coupled to said means for selectively coupling said interline comb filter second output to said output terminal; and
    means for coupling said further interline comb filter output port to said second input port of said combining means.

5. The comb filter system set forth in claim 4 wherein said means for coupling said further interline comb filter to said combining means includes a filter having a bandpass response.

6. The comb filter system set forth in claim 5 wherein said further interline comb filter includes a further output port from which sums of non-delayed and line delayed signals are available, and said system includes means for selectively coupling to an output port thereof, said substantially motion-corrected first output signal in the absence of said relatively low frequency motion-induced signal and for coupling to said output port thereof said further output of said further interline comb filter on the occurrence of said relatively low frequency motion-induced signal.

7. An adaptive frame comb filter system for separating chrominance and luminance components from a composite video signal, comprising:
   a source of composite video signal;
   a frame comb filter having a luminance output port and a chrominance output port;
   a low-pass filter coupled to said chrominance output port, having an output port and having a transfer function which attenuates a signal having frequencies in the range of frequencies normally occupied by the chrominance signal;
   an interline comb filter having an input port coupled to said chrominance output port and having an output port from which a signal occurring in the spectral bands normally occupied by the luminance signal is available;
   a detector coupled to said low-pass filter for generating a control signal when signal produced from said low-pass filter exceeds a predetermined level;
   signal combining means having a first input port coupled to said luminance output port, having a second input port, and having an output port at which substantially motion-corrected luminance signal is available; and
   multiplexing means responsive to said control signal for coupling the output port of said interline comb filter to the second input port of said signal combining means and coupling a zero-valued reference thereto in the absence of said control signal.

8. The frame comb filter system set forth in claim 7 wherein said signal combining means includes a further input port and means responsive to said control signal for selectively coupling the output port of said low-pass filter to said further input port.

9. The frame comb filter system set forth in claim 7 wherein said interline comb filter includes a chrominance signal output port and said system further includes:
   a switch means having first and second input ports, a control input terminal coupled to said detector and an output port from which motion-corrected chrominance signal is available; and
   respective means for coupling said frame comb filter chrominance output port and said interline comb filter chrominance signal output port to the first and second input ports of said switch means.

10. The frame comb filter system set forth in claim 9 further including:
    means coupled to the luminance output port of said frame comb filter for extracting signal components in interleaved frequency bands normally occupied by chrominance signal; and
    wherein the means for coupling said switch means to the interline comb filter chrominance signal output port includes means for combining extracted signal from the luminance output port with chrominance signal from said interline comb filter.

11. The frame comb filter set forth in claim 10 wherein the means coupled to the luminance output port for extracting signal components includes the cascade connection of a further interline comb filter and a chrominance band-pass filter.

* * * * *